Dec. 11, 1962   G. KIPER ETAL   3,067,662
FLASH CONTROL STRUCTURE FOR CAMERAS
Filed Dec. 2, 1959   2 Sheets-Sheet 2

INVENTORS
GERD KIPER
GABRIELE EHGARTNER
BY
Michael S. Striker
Attorney

United States Patent Office 3,067,662
Patented Dec. 11, 1962

3,067,662
FLASH CONTROL STRUCTURE FOR CAMERAS
Gerd Kiper, Unterhaching, and Gabriele Ehgartner, Pullach, near Munich, Germany, assignors to Agfa Aktiengesellschaft, Leverkusen-Bayerwerk, Germany
Filed Dec. 2, 1959, Ser. No. 856,789
Claims priority, application Germany Dec. 20, 1958
13 Claims. (Cl. 95—11.5)

The present invention relates to cameras.

More particularly, the present invention relates to flash apparatus for cameras, which is to say the camera structure which controls the actuation of the flash structure.

Modern cameras require a mechanism which will enable several different types of operations to be performed in connection with the use of light from a flash with the camera. In general, cameras are required to have three settings one of which is selected depending upon the particular type of operation. Thus, there is a V setting to which a setting lever is moved preparatory to making a flash exposure with a self-timer operation, which is to say with a delay of several seconds before actuation of the shutter and flash so as to enable the photographer to make a photograph of himself. Also, the modern camera is required to have an X setting enabling the flash to be ignited simultaneously with shutter actuation, which is the usual situation. However, modern cameras in addition must be capable of use with flash devices which are required to be ignited a predetermined short interval of time before shutter actuation so as to give the flash an opportunity to obtain its maximum brilliance simultaneously with the maximum opening of the shutter, and for this purpose a selector lever is placed in an M position which will cause the flash circuit to close a predetermined time interval in advance of shutter actuation.

Although structures are known for fulfilling the above requirements, the known structures have several disadvantages. Thus, where the selector lever is placed in the M setting the known devices after an initial movement of the shutter blades suddenly stop the movement of the shutter blades for the predetermined length of time in advance of shutter actuation and then release the shutter operation. With this type of structure the parts are subjected to undesirably large stresses because of the shock and impact resulting from the sudden stopping of the movement of the shutter blades. Furthermore, because the shutter blades are initially moved and then restrained against movement for a predetermined interval, there is the danger that the shutter will not remain fully closed after its slight initial movement, and in order to avoid this danger it has become common to make the shutter blades extremely large so as to guarantee the shutter is closed even after this initial movement thereof, but of course this results in undesirably large shutter blades which rub against each other with a friction which is undesirably great and which consumes too much energy.

One of the objects of the present invention is to avoid the above drawbacks by providing a camera with a flash apparatus which will operate in an extremely smooth manner which is absolutely free of any impact or shock.

Another object of the present invention is to provide a camera flash apparatus which does not require the shutter blades to be made of a size great enough to guarantee that the shutter remains closed even after an initial movement thereof. Thus, it is an object of the invention to provide a structure of the above type where when the selector lever is placed in the M position there will not be an initial movement and then a retarding of the movement of the shutter.

A further object of the present invention is to provide a structure which will insulate the mechanisms which operate in the M and V settings of the selector lever from the shutter itself so that the latter is not influenced by these mechanisms.

An additional object of the present invention is to provide an arrangement which uses only one selector lever for self-timer operation, namely, the same selector lever which is used for the M and X operations.

Still another object of the invention is to provide an arrangement which will permit the operator to place the selector lever in any desired position and even to change these positions as desired in a manner entirely independent of shutter actuation. For example, with the present state of the art if the selector lever is placed in the V position for self-timer operation it is necessary to release the shutter before the lever can be moved out of the V position. With the structure of the invention, however, if the lever is placed in the V position, the operator can then, if he changes his mind, place it in any other desired position without first releasing the shutter.

A still further object of the invention is to provide an arrangement of the above type where no structure operates idly without accomplishing the purpose. For example, with the present state of the art a drive which is driven in connection with the M setting is also driven in other settings although no useful result is accomplished by this drive except in the M setting. With the structure of the invention the drive used in conjunction with the M setting is in an extremely simple way placed out of operation when the selector lever is placed in positions other than the M setting.

With the above objects in view the invention includes in a camera flash apparatus a support means and a rotary shutter actuating means turnably carried by the support means for actuating the shutter. A retarding lever cooperates with rotary shutter actuating means to prevent release of the latter, and a spring means cooperates with the retarding lever to move the latter in a position away from the actuating means so as to release the actuating means. The retarding lever and the actuating means have in engagement with each other a pair of surfaces at least one of which is smoothly curved so as to guarantee a smoth, impact-free and shock-free cooperation between the rotary shutter actuating means and the retarding lever. A manually operable release means cooperates with the retarding lever to release the latter to the force of the spring means, and in the V setting of a manually operable lever means the retarding lever acts through this latter manually operable or manually engageable lever means to actuate a drive which acts on an escapement mechanism to retard the movement of the retarding lever away from the rotary shutter actuating means for a predetermined length of time. In addition, this rotary shutter actuating means actuates a drive which closes the contacts of a switch contact assembly, in order to ignite the flash, when the manually engageable lever means is placed by the operator in the M position, and when the manually engageable lever means is placed in the X position, a switch operating pin which is carried by the shutter ring, which is turned by the rotary shutter actuating means, engages the contact assembly to close the switches thereof. The manually engageable lever means which is selectably placed in one of the above-mentioned three settings carries a cam means which cooperates with a follower means carried by the switch contact assembly to place this switch contact assembly either in a position where it will be actuated by the pin carried by the shutter ring when the manually engageable lever means is in its X position or in a position where the contact assembly will be actuated by a pin moved by the drive from the rotary shutter actuating means when the manually engageable lever means is placed in the M setting.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
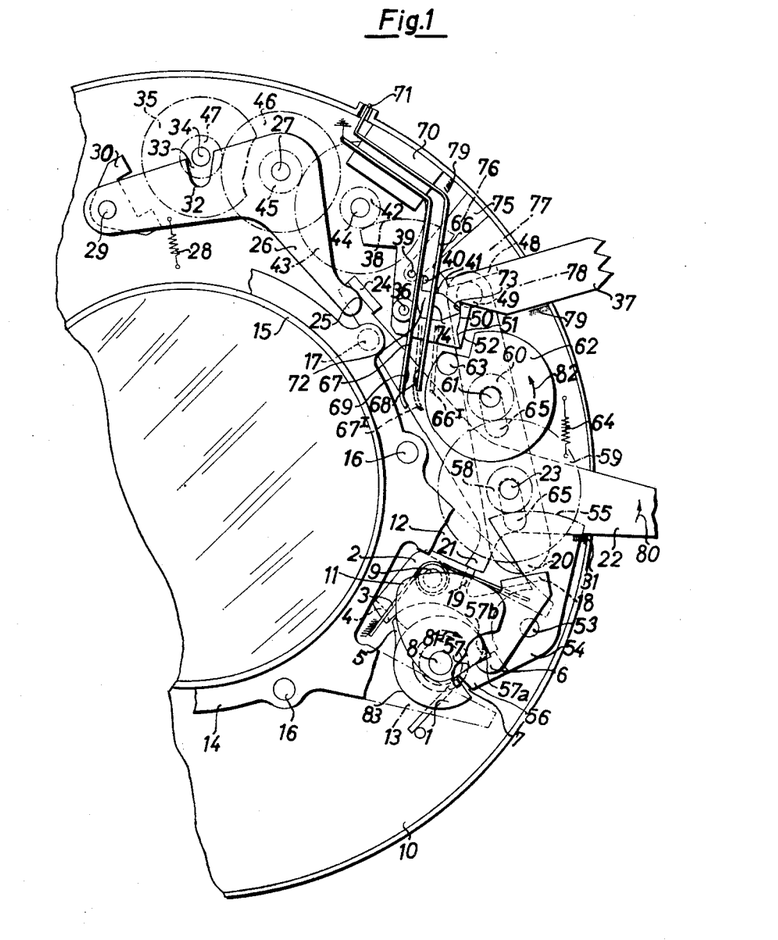
FIG. 1 is a fragmentary illustration of a shutter assembly which includes the structure of the invention.

With the structure of the invention a conventional, known means is used for cocking the shutter, and for the sake of clarity this known means is not illustrated in FIG. 1. FIG. 1 shows a wall of a shutter housing 10, this wall carrying the stationary pin 8 which extends through a bore formed in a rotary shutter actuating means 1 so that in this way the support means 1 for rotation. When the known structure is actuated to cock the shutter, an unillustrated spring is tensioned by being turned in the direction of the arrow 81 of FIG. 1 so as to urge the rotary shutter drive 1 in the direction of the arrow 81. This latter spring, since it is known, is not illustrated for the sake of clarity. This spring is tensioned so that it will drive the shutter actuating means 1 through a complete revolution.

A retarding lever 2 is illustrated in FIG. 1, this retarding lever serving to retard the rotation of the shutter actuating means 1, and a known unillustrated structure, also omitted for the same clarity, is provided to move the lever 2 in opposition to the spring 3 in a clockwise direction, as viewed in FIG. 1, to the position illustrated in FIG. 1. The spring 3 forms a spring means urging the retarding lever 2 away from the rotary shutter actuating means 1, and this spring 3 is coiled around the stationary pin 9 which is carried by the housing 10 and which extends into a bore of the lever 2 to support the latter for turning movement, the pins 8 and 9 being parallel. One end of the spring 3 bears against a stationary element carried by the support means 10, and the other end of the spring 3 bears against a projection 19 of the lever 2 so as to urge lever 2 in a counterclockwise direction, as viewed in FIG. 1. During the return movement of the lever 2, when the shutter is cocked, to the position shown in FIG. 1 the projection 4 of the lever 2 moves away from the projection 5 of the rotary shutter actuating means 1 and simultaneously the projection 6 of the lever 2 moves into a cutout 7 formed in the shutter drive 1 so that the projection 6 acts as a catch engaging the rotary member 1, when the shutter is cocked, to prevent release of the rotary member 1 as long as the retarding lever 2 remains in the position illustrated in FIG. 1. When the projection 4 of the lever 2 moves away from the projection 5 of the rotary drive member 1, this latter member will turn through only a few degrees until it engages the catch 6.

A cam 11 is fixed to and forms part of the rotary actuating means 1, and this cam 11 has the configuration of an equilateral triangle whose sides are of an arcuate configuration, as illustrated in FIG. 1. The inner wall 15 of the shutter housing 10 turnably carries a shutter ring 14 which fixedly carries a series of pins 16 to which the shutter blades are respectively connected in a well known manner so that during turning of the shutter ring 14 the shutter will open or close. This shutter ring 14 has a pair of extensions 12 and 13 between which the cam 11 is located, this cam 11 slidably engaging those surfaces of extensions 12 and 13 which are directed toward each other. During a complete revolution of the rotary shutter actuating means 1, 11 from the position of FIG. 1 back to the position of FIG. 1 in the direction of the arrow 81 the cam 11 cooperates with the extensions 12 and 13 to turn the ring 14 first in a clockwise direction, as viewed in FIG. 1, to open the shutter and then back, in a counter-clockwise direction, as viewed in FIG. 1, back to the position shown in FIG. 1 to close the shutter. As is apparent from FIG. 1, the cam 11 will turn from the initial position illustrated in FIG. 1 through a substantial angle before it starts to turn the ring 14. The shutter ring 14 additionally carries a switch operating pin 17 which acts in a manner described below to close the flash circuit when the manually engageable lever means 37 is placed in the X position, as will be apparent from the description which follows.

The retarding lever 2 includes in addition to the projection 19 which cooperates with the spring means 3 a projection 18 which cooperates with an end of an elongated push bar 20 which serves as a motion transmitting means for a purpose described below. The projection 19 is engaged by a projection 21 which forms one arm of a three-armed lever 22 which is the means operated by the operator for releasing the shutter. Thus, it is the outer free end of the arm 21 of the three-armed lever which is located in the path of movement of the projection 19 to prevent the spring means 3 from turning the retarding lever 2 away from the shutter drive means 1, 11 as long as the lever 22 remains in the position illustrated in FIG. 1. In order to release the shutter the operator engages the arm 22 and turns it in the direction of the arrow 80 shown in FIG. 1 so as to move the projection or arm 21 away from the projection 19. This three-armed lever 22 is turnably supported by a pivot pin 23 which is fixedly carried by the shutter housing 10 and which extends into and through a bore of the three-armed lever 22. In addition to the arm which extends to the right as viewed in FIG. 1 so as to be accessible to the operator and the arm 21 described above, the three-armed lever 22 has a third arm which at its outer free end is provided with a projection 24, engaging an arcuate surface 25 of a carrier lever 26 which carries an escapement 30. The carrier lever 26 is turnably supported by a stationary pivot pin 27 fixedly carried by the housing 10, and a spring 28 is connected at one end to the lever 26 and at its opposite end to the housing 10 to urge the lever 26 in a counterclockwise direction, as viewed in FIG. 1, so that the curved edge 25 of the lever 26 cooperates with the projection 24 of the lever 22 to urge the latter in a clockwise direction, in opposition to the arrow 80 shown in FIG. 1. This turning of the lever 26 and 22 by the spring 28 is limited by the stop 31 which engages the lever 22 in the manner shown in FIG. 1 and which is fixedly carried by the housing 10 in the path of turning movement of the right arm of the lever 22, as is evident from FIG. 1. The carrier lever 26 fixedly carries a pivot pin 29 on which the escapement 30 is pivotally supported, any suitable collars or the like being fixed to the pin 29 and engaging the escapement 30 to guarantee free turning of the latter without any possibility of axial movement of the escapement 30 along the axis of the pin 29. When the operator turns the lever 22 in the direction of the arrow 80 in opposition to the spring 28 the lever 26 will turn in a clockwise direction so as to place the escapement 30 in engagement with an escapement wheel 35 which is driven in the manner edscribed below so as to cooperate with the escapement 30 to provide a delay of given time interval, as will be apparent from the description which follows. The lever 26 is formed with a curved notch 32 whose innermost end engages the stationary pin 34 to serve as the limit of turning of the lever 26 in a clockwise direction and the lever 22 in the direction of the arrow 80 and also to guarantee proper positioning of the escapement 30 with respect to the escapement wheel 35. The stationary pin 34 which engages the lever 26 at the innermost end of the notch 32 as described above also serves to turnably support escapement wheel 35.

The structure described above forms part of the self-timer mechanism which also includes the manually engagable lever means 37 which is selectably placed in one of the three positions referred to above. This lever means 37 extends to the exterior of the housing 10 through a slot in the outer wall thereof so as to be accessible to the operator and the lever 37 is pivotally supported by a stationary pin 36 carried by the housing 10. The lever means 37 fixedly carries a gear sector 38 which meshes with a pinion 42 turnably carried by a stationary pin 44 which is carried by the housing 10, and the pinion 42 is fixed coaxially to a gear 43 also turnably carried by the pin 44, this gear 43 meshing with a pinion 45 which is turnably carried by the pin 27 which supports the carrier lever 26. The pinion 45 is fixed coaxially to the gear 46 which turns therewith and which meshes with a pinion 47 which is turnably carried by the stationary pin 34 and which is fixed to the escapement wheel 35 so that the latter turns with the pinion 47. Thus, it is apparent that during turning of the lever 37 the drive from the gear sector 38 through the gear train 42, 43, 45, 46, 47 to the escapement wheel 35 will be actuated. The lever 37 fixedly carries a projection 48 which is engaged by a pin 49 which is fixed to the push-bar 20 at the end of the latter distant from the projection 18 of the retarding lever 2. Also, the lever 37 fixedly carries a cam 52 provided with a concave surface 50 and a flat surface 51 which serve to control the position of a contact assembly described below according to whether the lever means 37 is placed by the operator in the X or in the M position.

The housing 10 fixedly supports a pin 53 which serves to pivotally support a lever 54 which also engages the rotary drive member 1, 11 in the position of the parts shown in FIG. 1, this lever 54 having at one end a toothed sector 55 and at its opposite end an arm 56 which extends into the notch 7 of the rotary shutter actuating means 1. The member 1 is provided with a substantially flat surface portion 57 and with a pair of curved surface portions 57a and 57b, as indicated in FIG. 1. As viewed in FIG. 1 the curved surface portion 57a is located at an elevation higher than the curved surface portion 57b and cooperates with the catch 6 at a flat surface of the latter, while the curved surface portions 57b is at the elevation of and cooperates with the elongated end portion 56 of the lever 54. Thus, the rotary drive means 1 includes a surface portion 57, 57a cooperating with the catch 6 of the retarding lever 2 and a surface portion 57, 57b cooperating with the end portion 56 of the lever 54. The toothed sector 55 of the lever 54 meshes with a pinion 58 which is turnably carried by the stationary pin 23 of the housing 10 and which is fixed coaxially with a gear 59 which is also turnable on the pin 23, this gear 59 meshing with a pinion 60 which is turnable on the stationary pin 61 of the housing 10 and which is fixed coaxially to a disc 62 which is also turnable on the pin 61. The disc 62 fixedly carries a switch operating pin 63 for a purpose described below. A spring 64 is fixed at one end to the gear 59 and at its opposite end to a stationary part of the housing 10 so as to urge the gear 59 in a counter-clockwise direction, as viewed in FIG. 1, and thus urge the free end portion 56 of the lever 54 against the surface portion 57, 57b of the rotary shutter drive 1. The motion transmitting means formed by the push-bar 20 is formed with a pair of elongated slots 65 extending longitudinally of the bar 20 and through which the pins 23 and 61 extend so that these pins cooperate with the slots 65 to provide the bar 20 with a limited amount of longitudinal shifting movement.

The contact assembly includes a pair of leaf springs 66 and 67 respectively carrying the switch contacts 68 and 69, these springs 66 and 67 being carried by a block 70 of electrically non-conductive material, this block 70 being fixedly carried by the support means formed by the housing 10, in the manner illustrated in FIG. 1. The leaf spring 67 is electrically connected to ground, which is to say to the housing 10, while the spring 66 is electrically connected with the other pole 71 of the electrical circuit of the flash apparatus. A follower means is provided to cooperate with the cam means 50—52, and this follower means includes a follower member 72 made of an electrically non-conductive material and fixedly carried by the leaf spring 67. Distant from the leaf spring 67 the follower 72 is provided with a blunt, curved free end 73 cooperating with the camming surfaces 50 and 51 of the cam 52. In addition, intermediate its ends the follower 72 is provided with a stop surface 74 engaged by the spring 66 which presses, due to its own inherent resiliency, against the stop surface 74, so that this stop surface 74 controls the distance between the springs 66 and 67 when the contacts 68 and 69 are out of engagement with each other.

The manually engageable lever means 37 is formed with three detent recesses 39, 40, and 41 distributed about the pivot pin 36 of the lever 37 and cooperating with a detent projection carried by the leaf spring 75 which is fixedly carried by the outer wall of the housing 10. The manually engageable part of the lever 37 is shown in FIG. 1 at the position 78, indicated in dot-dash lines, and this is the V position used for self-timer operation, and in this position the detent projection carried by the spring 75 is located in the detent recess 39. The operator can turn the lever 37 in a counter-clockwise direction from the V position indicated by the dot-dash lines 78 to the X position indicated by the dot-dash lines 77, and in this latter position the detent projection carried by the spring 75 will be located in the intermediate detent recess 40. Finally, the lever 37 may be moved to the M position indicated by the dot-dash line 76 in FIG. 1, and in its latter position the projection carried by the spring 75 will be located in the detent recess 41. The extent to which the lever 37 may be turned is limited by a pair of stops 79 carried by the housing 10 as indicated in FIG. 1.

When it is desired to make an exposure the operator turns the manually operable release means 22 in the direction of the arrow 80. This will result in movement of the arm 21 of the three-armed lever 22 in a counter-clockwise direction, as viewed in FIG. 1, away from the projection 19 of the retarding lever 2, so that this retarding lever 2 is now released to the influence of the spring means 3 which can now turn the lever 2 in a counter-clockwise direction around the pivot pin 9, as viewed in FIG. 1. Thus, during this turning of the retarding lever 2 the projection 18 thereof will engage the push-bar 20 so as to longitudinally move the latter. If, as indicated in FIG. 1, the manually engageable lever means 37 has been placed by the operator in the V position, then the pin 49 of the motion-transmitting means 20 will engage the projection 48 so as to turn the lever 37 from the V position toward the X position, and as a result the gear sector 38 fixed to the lever 37 will act on the drive 42, 43, 45, 46, 47 to turn the escapement wheel 35. Of course, when the lever 22 is turned by the operator in the direction of the arrow 80 the carrier lever 26 is turned in the manner described above, and the turning of the lever 22 and 26 continues until the innermost part of the notch 32 is in engagement with the stationary pin 34, so that the escapement 30 is properly positioned with respect to the escapement wheel 35, and thus the spring 3 turns the retarding lever 2 away from the rotary shutter actuating means 1 and transmits a drive from the lever 2 through the push-bar 20 and the lever 37 to the gear train which actuates the escapement wheel 35. As a result of this construction, when the lever 37 is in the V position, the movement of the lever 2 away from the drive member 1 is strongly retarded, and the structure is so designed that the rotary shutter drive 1 will not be released from the retarding lever 2 until a period of approximately 10 seconds has elapsed, so that there is a sufficient period for the self-timer operation. At the end of this interval, the lever 37 will have reached the X position and the projection carried by the spring 75 will have moved into the detent recess 40. During this turning of the lever 37 from the V position to the X position the end 73 of the follower means 72 remains in engagement with the curved camming surface 50 so that the position of the contact assembly does not change. During the turning of the retarding lever away from the shutter actuating means 1, the flat surface of the catch 6 slides with respect to the smoothly curved surface portion 57, 57a referred to above so that there is a shock-free and impact-free smooth cooperation between the elements 1 and 2. Moreover, as was pointed out above, the cam 11 will turn through a predetermined substantial angle from the initial position thereof shown in FIG. 1 in a clockwise direction, indicated by the arrow 81, before the shutter ring 14 starts to turn, and the angle through which the cam 11 turns during operation of the self-timer structure as described above is less than the angle through which the cam 11 must turn before it starts to turn the ring 14, so that in this way the operation of the self-timer structure is entirely insulated from the shutter ring 14 and the shutter blades connected thereto so that no shocks of any kind can possibly be transmitted to the shutter blades.

Once the retarding lever 2 has moved away from the drive member 1, the latter is free to turn under the influence of the shutter cocking spring referred to above, and the member 1 would of course be turned by this spring in the direction of the arrow 81. However, during the initial part of the turning of the member 1 the shutter still will not be actuated because of the cooperation of the cam 11 with the extensions 12 and 13, as described above, and also an additional slight delay will be provided by the cooperation of the lever 54 with the rotary drive 1. Thus, when the spring turns the member 1 in the direction of the arrow 81 the member 1 acts on the lever 54 at the portion 56 thereof to turn the lever in a counter-clockwise direction, as viewed in FIG. 1, around the pivot pin 53. Because of the curved surface 57, 57b which cooperates with the portion 56 of the lever 54, the latter cooperates with the member 1 also in a smooth, impact-free and shock-free manner. The parts which are driven in this way by the rotary member 1 have a certain mass which must be accelerated and set into motion, and this mass is made up of the member 1 itself, as well as the lever 54, the gear train 58, 59, 60 driven from the toothed sector 55, and the pin 63 as well as the disc 62 which carries the same, and the mass constituted by all of these elements is of such a magnitude that during the initial turning of the member 1 to turn the lever 54 and thus drive this gear train in opposition to the spring 64 there will be a delay of approximately 15 milliseconds before the notch 7 is clear of the arm 56 of the lever 54, the member 1 then being freely turned by the spring while its outer periphery 83 slides along the arm 56. As is apparent from FIG. 1, during this delay of 15 milliseconds provided by cooperation of element 54 with the drive 1, the cam 11 still will not have started the turning of the shutter ring 14. Thus, the angle through which the member 1 turns in order to locate the arm 56 entirely out of the notch 7 is less than the angle through which the cam 11 turns from the position shown in FIG. 1 in order to start the turning of the ring 14, so that in this way the operation of the drive from the member 1 to the pin 63 also is completely insulated from the ring 14 and the shutter blades carried thereby. This drive will turn the pin 63 together with the disc 62 in the direction of the arrow 82 and the pin 63 will approach the spring 66 of the contact assembly. The pin 63 will move first toward the spring 66 and then during the continued turning of the disc 62 in the direction of the arrow 82 the pin 63 will move away from the spring 66, but in the position of the parts shown in FIG. 1 where the follower 72 engages the camming surface 50 of the cam 52 the contact assembly 66—69 will be located beyond the path of movement of the pin 63 so that there will be no actuation of the contact assembly by the pin 63 when the parts are in the position shown in FIG. 1. The pin 63 and the disc 62 complete their turning from the position indicated in FIG. 1 before they have turned through an entire revolution. Thus, by the time the arm 56 is out of the cutout 7 the disc 62 will have been turned through less than 360 degrees.

Once the arm 56 of the lever 54 is out of the notch 7, the spring which drives the rotary member 1 can now freely turn the latter, and it is only when the arm 56 has been located completely out of the notch 7 that the cam 11 has reached the position where it will start to turn the ring 14, and the spring will rotate the member 1 as well as the cam 11 in the direction of the arrow 81 so as to first open the shutter, maintain the shutter in the open position, and then close the shutter. During the initial turning of the ring 14, this ring will turn in a clockwise direction, as viewed in FIG. 1, and when the shutter has almost reached its fully open position the pin 17 will engage the spring 67 so as to place the contact 69 in engagement with the contact 68 and close the circuit of the flash. The contacts 68 and 69 remain in engagement with each other until the ring 14 turns back toward its starting position in order to close the shutter. The return movement of the ring 14 stops when the projection 5 of the member 1 engages the projection 4 of the lever 2, this lever 2 at the instant being displaced in a counter-clockwise direction from the position shown in FIG. 1 so that the projections 4 is located in the path of turning of the projection 5. Just before the projection 5 engages the projection 4, the cam 11 has placed the ring 14 back in its initial position where the shutter is fully closed and at this time, as is evident from FIG. 1, the continued turning of the cam 11 will have no influence on the ring 14 so that at the instant when the projection 5 engages the projection 4 the ring 14 will have already reached its final position and stopped moving so that the impact of the engagement of projection 5 on the element 4 will have absolutely no influence on the shutter.

As was mentioned above, when the shutter is cocked the unillustrated spring which drives the member 1 is tensioned in the direction of the arrow 81 to an extent sufficient to again drive the member 1 through a full revolution, and at the same time in a known way, not illustrated for the sake of clarity, the retarding lever 2 is turned in a clockwise direction, as viewed in FIG. 1, so that the projection 4 of the retarding lever 2 moves away from the projection 5 of the drive member 1 while the catch 6 moves into the cutout 7 so that upon the slight turning of the member 1 when the projection 4 moves away from the projection 5 the surface 57, 57a will simply move into engagement with the catch 6 and the parts are again in position as shown in FIG. 1. This slight turning of the member 1 when the projection 4 moves away from the projection 5 is sufficient to allow the spring 64 to act through elements 59 and 55 on the lever 54 to locate the arm 56 of the lever 54 in the cutout 7 in engagement with the surface 57, 57b. Of course, at this time the drive from the gear 59 will also be transmitted to the disc 62 for returning the pin 63 to its initial position. Until the arm 56 enters into the notch 7 it remains in engagement with the outer periphery 83 of the member 1. Of course, during the return of the retarding lever 2 to the position shown in FIG. 1, the projection 19 of the lever 2 moves away from the left side of the arm 21 of the lever 22, as viewed in FIG. 1, so that this lever 22 is now released to the influence of the spring 23 to return to the position shown in FIG. 1 where the arm 21 has its free end in engagement with the projection 19. As was pointed out above the stop 31 limits the turning of the levers 26 and 22 by the spring 28.

This return of the lever 22 to its initial position shown in FIG. 1 is accompanied by the return of the lever 26 to the position as shown in FIG. 1 so that at this time the escapement 30 moves away from the escape wheel 35. Also, as is evident from the above description, when the lever 37 is placed in the position indicated by the line 78, which is to say the V position, the lever 37 will automatically be moved away from this position to the X position indicated by the line 77, so that the lever 37 will have been automatically placed in this X position. At this time the manually engageable lever means 37 can be selectably placed by the operator, without any appreciable resistance from the self-timing structure, either again in the V position or in the M position indicated by the line 76. Of course, the operator may simply choose to leave the lever 37 in the intermediate X position. If the lever 37 is returned to the V position indicated by the line 78, then of course the above-described operations will be repeated.

If the lever 37 remains in the X position, then there will be no return of the push-bar 20 to the position indicated in FIG. 1. Thus, if the shutter is now released with the lever 37 in the X position, the action of the spring 3 on the lever 2 will not be opposed by the self-timer mechanism and the retarding lever 2 moves quickly away from the shutter actuating means 1 so that the shutter will now be actuated without the delay of the self-timer structure. Now the structure operates in the manner described above, which is to say, the turning cam 11 will turn the ring 14 and will cause the pin 17 to close the circuit when the shutter has almost reached its fully open position.

It should be noted that with the above-described structure if the operator returns the lever 37 to the V position and then changes his mind before actuating the lever 22 to release the shutter, the operator can simply return the the lever 37 to either the X position or the M position. This is in sharp contrast with known structures where the operator cannot return a self-timing lever to its initial position once this self-timing lever is set to operate, without first making an exposure. Thus, with the known structures once the self-timing lever is set to operate the self-timing mechanism the shutter must be actuated to make an exposure, while with the structure described above and shown in FIG. 1 the operator can move the lever 37 from the position illustrated in FIG. 1 to any other desired position, and all that takes place is that the gear sector 38 drives the gear train connecting the sector 38 to the escapement wheel 35 and the latter simply turns freely at this time.

If the operator chooses to place the lever 37 in the M position indicated by the line 76, then the lever 37 will be turned to an angle sufficient to put the substantially flat surface 51 of the cam 52 in engagement with the end 73 of the follower 72, and as a result the springs 66 and 67 due to their inherent resiliency will move to the dotted line position fragmentarily indicated in FIG. 1. This dotted line position is indicated at 66', 67'. When the lever 22 is now turned in the direction of the arrow 80 so as to release the shutter, the retarding lever 2 will move quickly away from the rotary member 1 since the self-timer mechanism will not delay the movement of the lever 2 by the spring 3, and at this time the member 1 through its turning of the lever 54 will cause the pin 63 to move the spring 66 toward the spring 67 to place the contact 68 in engagement with the contact 69 at the very beginning of the turning of the member 1. The pin 63 remains in engagement with the spring 66 only during the initial part of the turning of the disc 62, and after this initial turning the pin 63 moves away from and beyond the spring 66 so that the contacts 68 and 69 are again spaced from each other and the circuit is open at this time. The pin 63 may be made of an electrically non-conductive material, and when the spring 66 has been moved by the pin 63 sufficiently toward the spring 67 the contact 68 will engage the contact 69 to close the circuit at the instant of contact between the contacts 68 and 69. However, it is also possible to make the pin 63 of electrically conductive material, and in this event the spring 67 and the contact 69 will not participate in the closing of the circuit to the flash. Where the pin 63 is made of an electrically conductive material, then in the M setting the circuit of the flash will be closed as soon as the pin 63 engages the leaf spring 66, since the leaf spring 66 will in this event be connected to ground through the pin 63. Thus, with this latter construction care should be taken to make sure that the pin 63 does not engage the spring 66 when the parts are in their rest position and only engages the spring 66 after the disc 62 starts to turn.

Thus, when the manually engageable lever means 37 is placed in the M position indicated by the line 76 in FIG. 1, the pin 63 will close the circuit at a time interval on the order of 15 milliseconds before the shutter starts to move from its closed or its open position.

Figure 2:
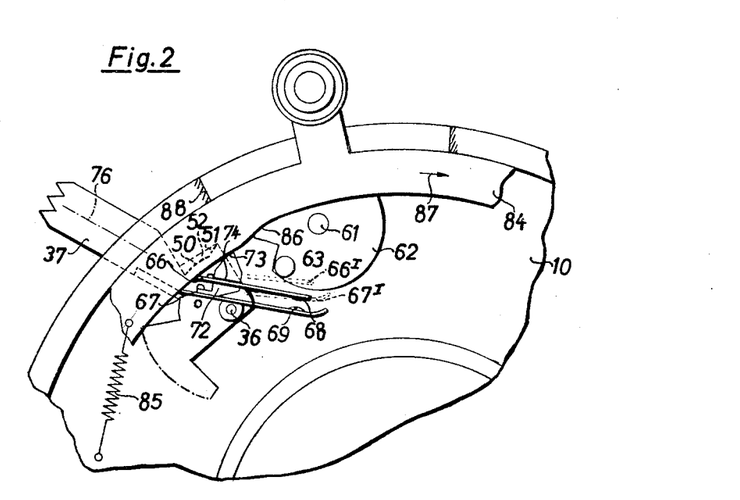
FIG. 2 is a fragmentary illustration of a structure which will reliably prevent closing of contacts during return of the parts to their initial position after exposure has been made.

In the discussion above the case has been considered where the manually engageable selecting lever means 37 is moved to the M position indicated by the line 76 after the shutter has been cocked and the lever 22 is in the position shown in FIG. 1. However, the case where the shutter is cocked when the lever 37 is already in the M position must also be considered, and this situation will arise where repeated exposures are made with the lever 37 remaining in the M position. In this latter case in order to prevent closing of the circuit during the return of the pin 63 to its initial position a structure is provided to move the contact assembly 66—69 back to the solid line position thereof illustrated in FIG. 1 during cocking of the shutter while the lever 37 is in the M position. As is illustrated in FIG. 2 one possible structure for accomplishing this result may be in the form of a camming portion 86 of the manually movable element 84 which is actuated by the operator for the purpose of cocking the shutter. The ring 84 is turned by the operator in the direction of the arrow 87 of FIG. 2 in order to cock the shutter, and the spring 85 cooperates with the ring 84 to return it to its rest position. The ring 84 is thus moved in opposition to the spring 85 in order to cock the shutter, and during the cocking of the shutter the cam portion 86 of the ring 84 will engage the end 73 of the follower 72 to move the contact assembly 66—69 from the dotted to the solid line position indicated in FIG. 2. As is apparent from FIG. 2 the follower 72 extends upwardly beyond the cam 50 toward the viewer of FIG. 2, and the ring 84 is located over the cam 50 and the lever 37 as indicated in FIG. 2, so that the camming edge 86 can engage the follower and move the contact assembly to the solid line position indicated in FIG. 2 so as to prevent closing of the contacts during the return movement of the pin 63 to its initial position. The retarding lever 2 is turned to the position shown in FIG. 1 at the beginning of the cocking of the shutter but only after the camming edge 86 has moved the contact assembly to the solid line position of FIG. 2 so that it is not possible for the pin 63 to engage the spring 66 during return of the disc 62 and pin 63 to their starting position, and the pin 62 and spring 63 are already in their starting position when the operator releases the ring 84 to the spring 85 to be returned by the latter to its rest position, this rest position being determined by the stop 88 shown in FIG. 2.

The action of the self-timer mechanism on the retarding lever 2 when the lever 37 is in the V position takes place, as pointed out above, before any movement of the ring 14 is initiated, and only when the lever 2 has moved away from the rotary drive member 1 and after the arm 56 of the lever 54 is out of the notch 7 can the drive member 1 be turned by its drive spring for the purpose of actuating the shutter. Thus, the operation of the self-timer mechanism takes places without any impact or shock on the rotary drive 1 since the latter has not yet been moved in any manner which could produce any shock or impact. The only possible way that a shock could be produced is that when the catch 6 leaves the rotary shutter actuating means 1 the latter is very suddenly set into motion by its drive spring so as to produce such a suddden movement of the parts that they are subjected to shock in this way. However, shock is prevented at this instant as a result of the curved surface portions 57a and 57b, the curved surface portion 57a cooperating with the catch 6 and the curved surface portion 57b cooperating with the arm 56, as described above. These curved surface portions have such a curvature that the catch 6 and arm 56 slide from the rotary drive member 1 tangentially with respect to the periphery thereof so that at the instant of departure of the catch 6 and arm 56 from the member 1 there cannot be any impact or shock resulting from sudden starting of the rotation of the member 1 by its drive spring. Thus, the curved surface portions 57a and 57b have a predetermined special configuration which is of considerable significance for the operation of the device. After the lever 2 moves away from the drive member 1 the arm 56 will still engage the drive member 1 and the drive member 1 is not released to the full force of its drive spring until the arm 56 has been located out of the notch 7, and of course the cooperation of the surface 57b with the arm 56 prevents any shock at this time. As was pointed out above, a further protection is provided from the fact that the cam 11 does not reach an angular position where it starts to turn the ring 14 until after the lever 2 and the arm 56 are in their positions where the catch 6 does not engage the rotary member 1 and the arm 56 is out of the notch 7 simply resting against the periphery 83. Thus, the shutter ring 14 is maintained stationary during the period when the elements 2 and 54 move with respect to the element 1, so that the shutter ring is insulated from these elements in any event.

As is apparent from the above discussion, when the manually engageable lever means 37 is in the intermediate X position indicated by the line 77 in FIG. 1 the elements 54, 58, 59, 60, 62 and 63 will have no influence on the operation since the pin 63 will turn without engaging the contact assembly. However, there is a certain disadvantage in the fact that because of the mass of these elements, which are still operated by pressing of the member against the arm 56 there is a certain delay in the release of the member 1 on the order of 15 milliseconds. Thus, even though the lever 37 is in the X position, when the operator actuates the lever 22 to release the shutter, the shutter will not operate immediately and instead there will be a delay on the order of 15 or 16 milliseconds before the shutter is set into operation, this delay being caused by the necessity of driving the elements 54, 59, 58, 60, 62 and 63. In most cases this delay will be of absolutely no significance. However, there are certain cases where such delay can have an undesirable effect and may result in unsatisfactory photographs. For example, when taking action photographs of rapidly moving subjects, the delay of 15 or 16 milliseconds between release of the shutter and actual movement of the shutter toward its open position may be highly undesirable.

Figure 3:
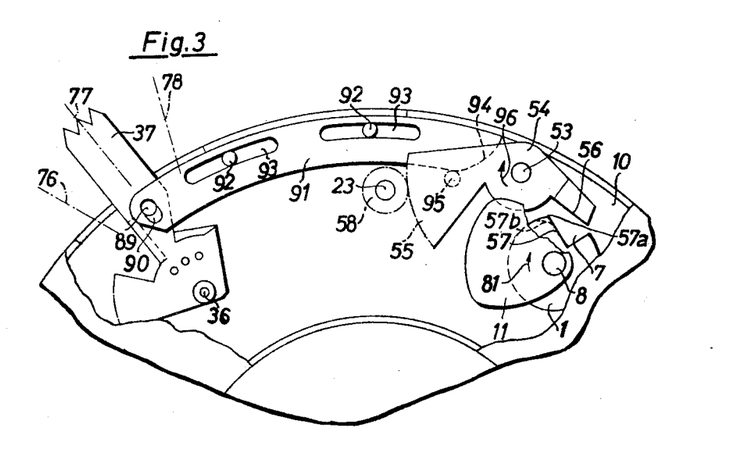
FIG. 3 illustrates a structure which will reliably place out of operation the drive which is required only in one setting of a selector lever in such a way that this drive will not operate in any other setting of the selector lever.

This disadvantage is avoided according to the invention with a structure as illustrated in FIG. 3 where with an extremely simple device the lever 54 is turned to an inoperative position away from the drive member 1 out of the cutout 7 thereof in the X and V positions of the lever 37. Thus, when the lever 37 is in the X position and no self-timer operation is used, the rotary drive 1 will turn without any opposition by the arm 56 of the lever 54, and this at the instant of actuation of the lever 22 by the operator the rotary shutter actuating means 1 will immediately start to turn and will actuate the shutter without any delay whatsoever. A further advantage of this arrangement resides in the fact that the drive for the contact 63 as well as the surface 57, 57b of the member 1 will operate only when the lever 37 is in the M position, and this is of course relatively seldom, so that the wear of the parts wil be decreased inasmuch as they will not operate so often and the energy required for operation in the X and V positions of the lever 37 is reduced.

FIG. 3 shows one possible structure for placing the lever 54 in an inoperative position when the lever 37 is in the X and V positions. Referring to FIG. 3, it will be seen that the lever 37 is illustrated therein in the intermediate X position indicated by the line 77. The lever 37 in this case carries a pin 89 which extends into a slot 90 formed in an elongated motion transmitting member 91 which is formed with slots 93 into which stationary pins 92 of the housing 10 extends so as to guide the motion transmitting member 91 for movement around the axis of the shutter housing during turning of the lever 37. At its right end, as indicated in FIG. 3, the member 91 is formed with a curved camming edge 94, and this camming edge 94 cooperates with a pin 95 fixedly carried by the lever 54. Of course, if desired, the pin 95 may be carried by the element 91 and the camming edge 94 may be provided on the lever 54. Also, if desired, the pin 89 may be carried by the element 91 and the slot 90 can be formed in the lever 37.

The camming edge 94 has such a curvature that in the X and V settings of the lever 37, indicated by the lines 77 and 78, respectively, the edge 94 cooperates with the pin 95 to locate the lever 54 in a position where its arm 56 is completely out of the notch 7 of the rotary drive 1. The spring 64 acts on the lever 54 to tend to turn the latter in the direction of the arrow 96 of FIG. 3, and thus this spring serves to maintain the pin 95 in engagement with the camming edge 94. The curvature of the camming 94 is also carefully designed so that when the lever 37 moves into the M position the arm 56 moves without any shock or impact into engagement with the surface 57, 57b of the rotary drive 1.

It will be understood that each of the elements described above, or two or more together, may also find a useful application in other types of cameras differing from the types described above.

While the invention has been illustrated and described as embodied in flash apparatus for cameras, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera flash control apparatus, in combination, support means; a rotary shutter driving assembly turnably carried by said support means and having a control surface; a retarding lever turnably carried by said support means and having an operating position where a catch surface of said retarding lever engages said control surface of said rotary member to prevent rotation of the latter, said retarding lever being turnable in a direction which displaces said catch surface thereof from said control surface of said rotary member to release the latter for actuating the shutter, at least one of said surfaces being smoothly curved so that said lever and rotary member cooperate with each other in a smooth, impact-free and shock-free manner; spring means cooperating with said lever for urging the same in said direction to release said rotary member; driven means driven by said lever when the latter is turned by said spring means in said direction, said driven means retarding the turning of said lever by said spring means so as to maintain said surfaces in engagement with each other for a predetermined length of time; manually operable means cooperating with said lever for releasing the latter to said spring means at the will of the operator; a pair of electrical contacts adapted to be placed in engagement with each other for closing a circuit to a flash device; and contact moving means cooperating with one of said contacts for moving the same into engagement with the other contact for closing said circuit, said driven means controlling the time interval between release of said lever by said manually operable means and closing of said circuit by said contact moving means.

2. In a camera, in combination, support means; a shutter ring turnably carried by said support means; rotary turning means cooperating with said shutter ring for turning the latter, said rotary turning means having a predetermined starting position from which it turns in order to actuate the shutter ring and said rotary, turning means turning from said starting position thereof through a predetermined angle before it starts to turn said shutter ring; a retarding lever turnably carried by said support means and cooperating with said rotary turning means to prevent turning of the latter from said starting position thereof as long as said retarding lever engages said rotary turning means; spring means cooperating with said retarding lever for moving the latter away from said rotary turning means; manually operable means cooperating with said lever for releasing the latter to said spring means; driven means driven by said lever to retard the turning movement thereof after release to said spring means so as to maintain said lever in engagement with said rotary turning means for a predetermined length of time before said rotary turning means is released, the turning of said rotary turning means during the interval that it engages said lever while the latter is moved by said spring means being through an angle less than said predetermined angle so that said shutter ring is not turned during the time that said retarding lever engages said rotary turning means; a pair of electrical contacts adapted to be placed in engagement with each other for closing a circuit to a flash device; and contact moving means cooperating with one of said contacts for moving the same into engagement with the other contact for closing said circuit, said driven means controlling the time interval between release of said lever by said manually operable means and closing of said circuit by said contact moving means.

3. In a camera flash control apparatus, in combination, support means; a rotary shutter driving member turnably carried by said support means and having a control surface; a retarding lever turnably carried by said support means and having a catch surface engaging said control surface to prevent rotation of said shutter driving member to actuate the shutter as long as said catch surface of said retarding lever engages said control surface of said rotary driving member, at least one of said surfaces being smoothly curved to provide a smooth, impact-free and shock-free cooperation between said lever and rotary member; spring means cooperating with said lever for urging the latter in a direction which moves said catch surface away from said control surface; a manually operable release lever turnably carried by said support means and having three arms one of which is accessible to the operator for turning said release lever, the second of which engages said lever to prevent turning of the latter by said spring means until the operator turns said release lever by engaging and moving said one arm thereof, and the third arm of which extends away from the other two arms; an escapement; a carrying lever turnably carrying said escapement and turnably carried by said support means, said carrying lever having distant from the escapement carried thereby a portion engaging said third arm of said release lever to be moved when said release lever is turned to release said retarding lever, said carrying lever being removed by said release lever when the latter is actuated by the operator in a direction placing said escapement in an operating position; an escapement wheel cooperating with said escapement only when the latter is in said operating postion thereof; a drive means cooperating with said escapement wheel for turning the latter, said drive means having a portion located in the path of turning movement of said retarding lever when the latter is released by the operator to said spring means so that movement of said portion of said drive means by said retarding lever actuates said drive means to turn said escapement wheel whereby said drive means, escapement wheel, and escapement retard the movement of said retarding lever away from said rotary member for a predetermined length of time; a pair of electrical contacts adapted to be placed in engagement with each other for closing a circuit to a flash device; and contact moving means cooperating with one of said contacts for moving the same into engagement with the other contact for closing said circuit, said drive means, escapement wheel and escapement controlling the time interval between release of said retarding lever by the operator and closing of said circuit by said contact moving means.

4. In a camera flash apparatus, in combination, rotary shutter drive means; a retarding lever cooperating with said rotary shutter drive means to prevent rotation of the latter as long as said retarding lever engages said rotary shutter drive means; spring means cooperating with said retarding lever for moving the latter away from said rotary shutter drive means to release the latter to actuate the shutter; manually operable means cooperating with said lever for releasing the latter to said spring means at the will of the operator; retarding means cooperating with said lever when said retarding means is in an operating position to retard the movement of said lever away from said drive means for a predetermined interval of time; adjusting means accessible to the operator for setting said retarding means in said operating position thereof to retard said lever for said interval of time or out of said operating position thereof so that said retarding means does not act on said lever, whereby when said retarding means is out of said operating position thereof said manually operable means will release said lever immediately to said spring means to be immediately moved away from said drive means so that the shutter will be actuated without delay; a pair of electrical contacts adapted to be place in engagement wtih each other for closing a circuit to a flash device; and contact moving means cooperating with one of said contacts for moving the same into engagement with the other contact for closing said circuit, said retarding means when it is in its operating position controlling the time interval between release of said lever and closing of said circuit by said contact moving means and said retarding means having no influence on said time interval between release of said lever and closing of said circuit when said retarding means is out of said operating position thereof.

5. In a camera flash apparatus, in combination, support means; rotary shutter drive means carried by said support means; a retarding lever turnably carried by said support means and cooperating with said rotary shutter drive means to prevent turning of the latter as long as said retarding lever engages the same; spring means cooperating with said retarding lever for urging the same away from said rotary drive means; manually operable release means cooperating with said lever for releasing the same to said spring means; an escapement means; means actuated by said manually operable means when the latter releases said lever to said spring means for placing said escapement means in an operating position; escapement drive means located in the path of movement of said lever when the latter is turned by said spring means and cooperating with said escapement means actuating the latter, whereby the turning of said lever away from said shutter drive means is retarded for a predetermined length of time, said escapement driving means including an elongated bar longitudinally shiftably carried by said support means and located in the path of turning movement of said lever to be moved by the latter; a pair of electrical contacts adapted to be placed in engagement with each other for closing a circuit to a flash device; and contact moving means cooperating with one of said contacts for moving the same into engagement with the other contact for closing said circuit, said escapement and escapement drive means controlling the time interval between release of said lever and closing of said circuit by said contact moving means.

6. In a camera flash apparatus, in combination, support means; electrical switch means carried by said support means and adapted to be closed for igniting a flash device; a manually engagable setting lever means having M, X, and V positions and cooperating with said switch means to set the latter for igniting a flash in advance of shutter operation, substantially simultaneously with shutter operation, and for self-timer operation, respectively; escapement means carried by said support means; drive means operatively connected with said lever means and said escapement means for driving said escapement means when said lever means is moved from said V to said X position; rotary shutter actuating means carried by said support means; a retarding lever cooperating with said shutter actuating means for preventing turning of the latter to actuate the shutter; motion transmitting means extending from said retarding lever to said manually operable lever means for turning the latter from said V to said X position during movement of said retarding lever away from said shutter actuating means to release the latter; spring means cooperating with said retarding lever for urging the same away from said shutter actuating means; and manually operable release means cooperating with said retarding lever for releasing the latter to said spring means, whereby when said manually engageable lever means is placed in said V position for self-timer operation the manually engageable lever means will automatically move from said V to said X position while said escapement means is driven to prevent the retarding lever from releasing the shutter actuating means for a predetermined time interval after the retarding lever is released.

7. In a camera flash apparatus, in combination, support means; electrical switch means carried by said support means and adapted to be closed for igniting a flash device; a manually engageable setting lever means having M, X, and V positions and cooperating with said switch means to set the latter for igniting a flash in advance of shutter operation, substantially simultaneously with shutter operation, and for self-timer operation, respectively; escapement means carried by said support means; drive means operatively connected with said lever means and said escapement means for driving said escapement means when said lever means is moved from said V to said X position; rotary shutter actuating means carried by said support means; a retarding lever cooperating with said shutter actuating means for preventing turning of the latter to actuate the shutter; motion transmitting means extending from said retarding lever to said manually operable lever means for turning the latter from said V to said X position during movement of said retarding lever away from said shutter actuating means to release the latter; spring means cooperating with said retarding lever for urging the same away from said shutter actuating means; and manually operable release means cooperating with said retarding lever for releasing the latter to said spring means, whereby when said manually engageable lever means is placed in said V position for self-timer operation the manually engageable lever means will automatically move from said V to said X position while said escapement means is driven to prevent the retarding lever from releasing the shutter actuating means for a predetermined time interval after the retarding lever is released, said drive means for driving said escapement means being in the form of a gear train and said manually engageable lever means fixedly carrying a gear sector meshing with the first gear of the gear train for actuating the latter to drive the escapement means during turning of said manually engageable lever means.

8. In a camera flash apparatus, in combination, a support means; manually engageable lever means turnably carried by said support means for movement by the operator to a selected one of three positions as follows: an M position where a flash will be ignited a given time interval in advance of shutter actuation, an X position where the flash will be ignited simultaneously with shutter actuation, and a V position for self-timer operation; an electrical contact assembly including a pair of contacts which close the circuit to a flash when said contacts engage each other; follower means carried by said contact assembly; cam means carried by said lever means and cooperating with said follower means for controlling the position of the contact assembly according to the selected position of said lever means; rotary shutter actuating means carried by said support means; manually operable means cooperating with said shutter actuating means to release the latter to actuate the shutter; a drive driven by said rotary shutter actuating means when the latter is released to actuate the shutter, said drive including a train of elements the first of which is driven directly from said rotary shutter actuating means and the last of which is in the form of a turnable member; and a switch actuating pin carried by said turnable member and engaging the contact assembly to place the contacts thereof in engagement with each other when said lever means is in said M position.

9. In a camera flash apparatus, in combination, a support means; manually engageable lever means turnably carried by said support means for movement by the operator to a selected one of three positions as follows: an M position where a flash will be ignited a given time interval in advance of shutter actuation, an X position where the flash will be ignited simultaneously with shutter actuation, and a V position for self-tmer operation; an electrical contact assembly including a pair of contacts which close the circuit to a flash when said contacts engage each other; follower means carried by said contact assembly; cam means carried by said lever means and cooperating with said follower means for controlling the position of the contact assembly according to the selected position of said lever means; rotary shutter actuating means carried by said support means; a shutter ring turnably carried by said support means and turned by said rotary shutter actuating means; and a switch-actuating pin carried by said shutter ring and engaging said contact assembly to close the contacts thereof when said shutter ring turns and when said lever means is placed by the operator in said X position so that said cam means and follower means cooperate to locate the contact assembly in the path of movement of said pin to be engaged by the latter.

10. In a camera flash apparatus, in combination, a support means; manually engageable lever means turnably carried by said support means for movement by the operator to a selected one of three positions as follows: an M position where a flash will be ignited a given time interval in advance of shutter actuation, an X position where the flash will be ignited simultaneously with shutter actuation, and a V position for self-timer operation; an electrical contact assembly including a pair of contacts which close the circuit to a flash when said contacts engage each other; follower means carried by said contact assembly; cam means carried by said lever means and cooperating with said follower means for controlling the position of the contact assembly according to the selected position of said lever means; rotary shutter actuating means carried by said support means; manually operable means cooperating with said shutter actuating means to release the latter to actuate the shutter; a drive driven by said rotary shutter actuating means when the latter is released to actuate the shutter, said drive including a train of elements the first of which is driven directly from said rotary shutter actuating means and the last of which is in the form of a turnable member; a switch actuating pin carried by said turnable member and engaging the contact assembly to place the contacts thereof in engagement with each other when said lever means is in said M position; manually operable means cooperating with said actuating means for returning the latter to its initial position and freeing said drive means and pin for return to their initial position also; and second cam means actuated by said latter manually operable means and cooperating with said follower means for placing said contact assembly in a position out of the path of movement of said pin during return of the latter to its initial position so that the flash is not ignited during the return of the parts to their initial position.

11. In a camera flash apparatus, in combination, a support means; manually engageable lever means turnably carried by said support means or movement by the operator to a selected one of three positions as follows: an M position where a flash will be ignited a given time interval in advance of shutter actuation, an X position where the flash will be ignited simultaneously with shutter actuation, and a V position for self-timer operation; an electrical contact assembly including a pair of contacts which close the circuit to a flash when said contacts engage each other; follower means carried by said contact assembly; cam means carried by said lever means and cooperating with said follower means for controlling the position of the contact assembly according to the selected position of said lever means; rotary shutter actuating means carried by said support means; manually operable means cooperating with said shutter actuating means to release the latter to actuate the shutter; a drive driven by said rotary shutter actuating means when the latter is released to actuate the shutter, said drive including a train of elements the first of which is driven directly from said rotary shutter actuating means and the last of which is in the form of a turnable member; a switch actuating pin carried by said turnable member and engaging the contact assembly to place the contacts thereof in engagement with each other when said lever means is in said M position; and means connected to said lever means and cooperating with said drive means for placing the latter in an inoperative position where it will not be driven by said rotary actuating means when said lever means is placed in said X and V positions.

12. In a camera flash apparatus, in combination, a support means; manually engageable lever means turnably carried by said support means for movement by the operator to a selected one of three positions as follows: an M position where a flash will be ignited a given time interval in advance of shutter actuation, an X position where the flash will be ignited simultaneously with shutter actuation, and a V position for self-timer operation; an electrical contact assembly including a pair of contacts which close the circuit to a flash when said contacts engage each other; follower means carried by said contact assembly; cam means carried by said lever means and cooperating with said follower means for controlling the position of the contact assembly according to the selected position of said lever means; rotary shutter actuating means carried by said support means; manually operable means cooperating with said shutter actuating means to release the latter to actuate the shutter; a drive driven by said rotary shutter actuating means when the latter is released to actuate the shutter, said drive including a train of elements the first of which is driven directly from said rotary shutter actuating means and the last of which is in the form of a turnable member; a switch actuating pin carried by said turnable member and engaging the contact assembly to place the contacts thereof in engagement with each other when said lever means is in said M position; an elongated motion transmitting means connected with said lever means to be moved by the latter and cooperation with the first element of said drive means to place said first element out of the path of movement of said rotary shutter actuating means when said lever means is placed by the operator in said X and V positions.

13. In a camera flash apparatus, in combination, a support means; manually engageable lever means turnably carried by said support means for movement by the operator to a selected one of three positions as follows: an M position where a flash will be ignited a given time interval in advance of shutter actuation, an X position where the flash will be ignited simultaneously with shutter actuation, and a V position for self-timer operation; an electrical contact assembly including a pair of contacts which close the circuit to a flash when said contacts engage each other; follower means carried by said contact assembly; cam means carried by said lever means and cooperating with said follower means for controlling the position of the contact assembly according to the selected position of said lever means; rotary shutter actuating means carried by said support means; manually operable means cooperating with said shutter actuating means to release the latter to actuate the shutter; a drive driven by said rotary shutter actuating means when the latter is released to actuate the shutter, said drive including a train of elements the first of which is driven directly from said rotary shutter actuating means and the last of which is in the form of a turnable member; a switch actuating pin carried by said turnable member and engaging the contact assembly to place the contacts thereof in engagement with each other when said lever means is in said M position; an elongated motion transmitting means connected with said lever means to be moved by the latter and cooperating with the first element of said drive means to place said first element out of the path of movement of said rotary shutter actuating means when said lever means is placed by the operator in said X and V positions, said motion transmitting means being in the form of an elongated bar having a pin-and-slot connection with said lever means and having distant from said lever means a camming portion, said first element of said drive means having a follower portion engaged by said camming portion to be actuated thereby.

References Cited in the file of this patent

UNITED STATES PATENTS

| | | |
|---|---|---|
| 1,488,488 | Froelich | Apr. 1, 1924 |
| 1,954,673 | Krupnick | Apr. 10, 1934 |
| 1,968,597 | Blake | July 31, 1934 |
| 1,986,398 | Ireland | Jan. 1, 1935 |
| 2,047,662 | Barenyi | July 14, 1936 |
| 2,405,741 | Fuerst | Aug. 13, 1946 |
| 2,727,445 | Rentschler | Dec. 20, 1955 |
| 2,893,301 | Weise | July 7, 1959 |
| 2,923,218 | Mori | Feb. 2, 1960 |